March 12, 1946.  B. J. PAULSON  2,396,340
THRUST RINGS FOR PROPELLERS
Filed May 24, 1944   2 Sheets-Sheet 1
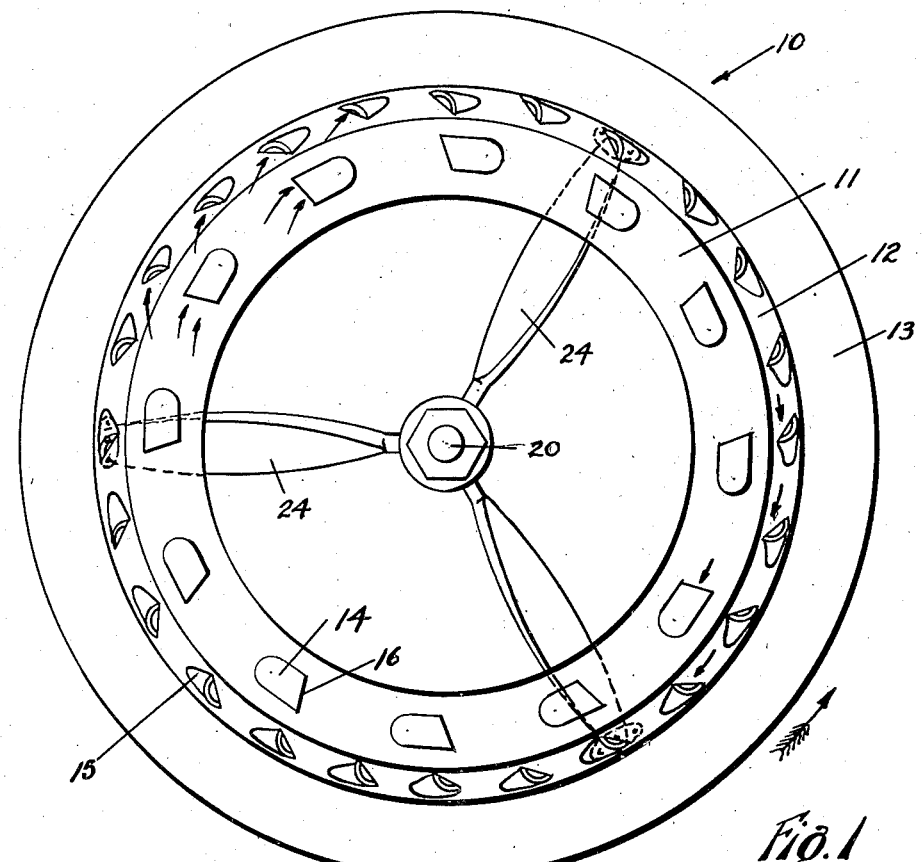
Fig. 1
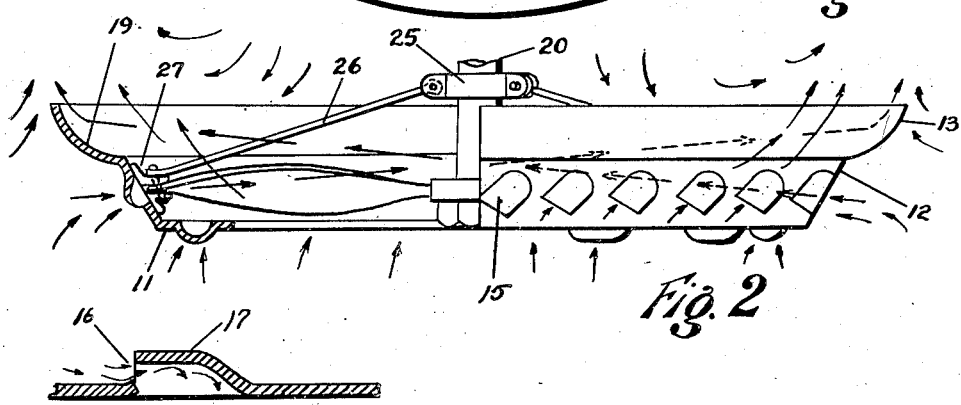
Fig. 2
Fig. 3
INVENTOR.
BERNARD J. PAULSON
BY
Christian R. Nielsen
ATTORNEY.

March 12, 1946.  B. J. PAULSON  2,396,340
THRUST RINGS FOR PROPELLERS
Filed May 24, 1944   2 Sheets-Sheet 2

INVENTOR.
BERNARD J. PAULSON
BY
Christian R. Nielsen
ATTORNEY.

Patented Mar. 12, 1946

2,396,340

UNITED STATES PATENT OFFICE 2,396,340

THRUST RING FOR PROPELLERS

Bernard J. Paulson, Waukesha, Wis.

Application May 24, 1944, Serial No. 537,147

6 Claims. (Cl. 170—168)

My invention relates to thrust rings, and more particularly to a type of thrust ring that may be applied and installed on the periphery of any type of propeller.

The object of my invention is to produce a device of the character described, that may be employed to supercharge the operating unit by centripetal attraction of the air, vapor, liquid or any other medium being used, and to use these centripetally attracted currents brought in from the general area behind the periphery of the operating unit, as a cushion of high density back of the forward face of the unit, against which the horizontal currents, flowing from the front of the unit, will impact themselves and merge with the high velocity currents flowing toward the center from the periphery of the device, and to direct this high velocity current centrifugally against the inner surface of the radial thrust ring, thereby providing a forward thrust by the air or other mediums in which it operates.

Another object of my invention is to reduce resistance of the operating medium immediately in front of the radial thrust ring, induced by the centripetally attracted, high velocity currents flowing into the operating unit through peripheral ports.

Still another object of my invention is to create a low pressure area immediately behind the operating unit.

A still further object of my invention is to provide a device that will function, as a fly wheel to help sustain momentum, balance the unit and reduce the "whip" or vibration prevalent in the conventional type of blade propellers, and Still another object of my invention is to provide a device that will accomplish all of the functions of a conventional blower, fan, or propeller, yet be of a smaller diameter due to its efficient performance.

A still further object of my invention is to relieve, and to a great extent, eliminate the customary strain placed upon the tips of propeller blades. This is accomplished first, by the reinforcing effect of the ring, braced against the propeller shaft tangently with the ring itself and second, by reason of the fact that the forward thrust on the inside concave surface of the radial thrust ring is greater than the air pressure against the leading surfaces of the annular disc ring, peripheral flange and thrust ring, this being a direct and logical result of reduced air resistance in front of the thrust ring caused by the high velocity radial intake of air through the peripheral ports and by the pressure developed rearwardly by the slip-stream from the thrust ring discharge area, setting up a compensating force against the ring in the direction in which the plane is flying.

A still further object of my invention is that louvres or atmospheric scoops on the front disc ring create a partial vacuum over that portion of the surface lying immediately back of each of these scoops, away from the direction of rotation, and extending to a point adjacent to the intake opening of the next successive louvre or scoop. This relatively large low pressure area will result in a compensating pushing force on the back side of the disc ring, thus further relieving the propeller blade tips of whip and strain, and also inducing a further propulsion force.

It is manifest to anyone familiar with the art that a device as described may be economically produced, easily installed, and is a practical means for increasing the efficiency of various types of air, gas, liquid propulsion units, such as airplane propellers, ship propellers, fluid drive impellers or the like, as well as increasing the volumetric efficiency of fans, blowers, superchargers or other similar devices.

Other and further objects of my invention will become more apparent as the description proceeds, when taken in conjunction with the drawings, in which:

Figure 1 is a front elevation of the device as applied to a conventional type of airplane propeller.

Figure 2 is a fragmentary cross sectional view of the entire assembly as shown in Figure 1.

Figure 3 is a cross sectional view of a portion of the thrust ring showing the manner in which the louvres are formed, and illustrating the radially formed lip to produce an inertia impact against the inner face of the canopy.

Figure 4:
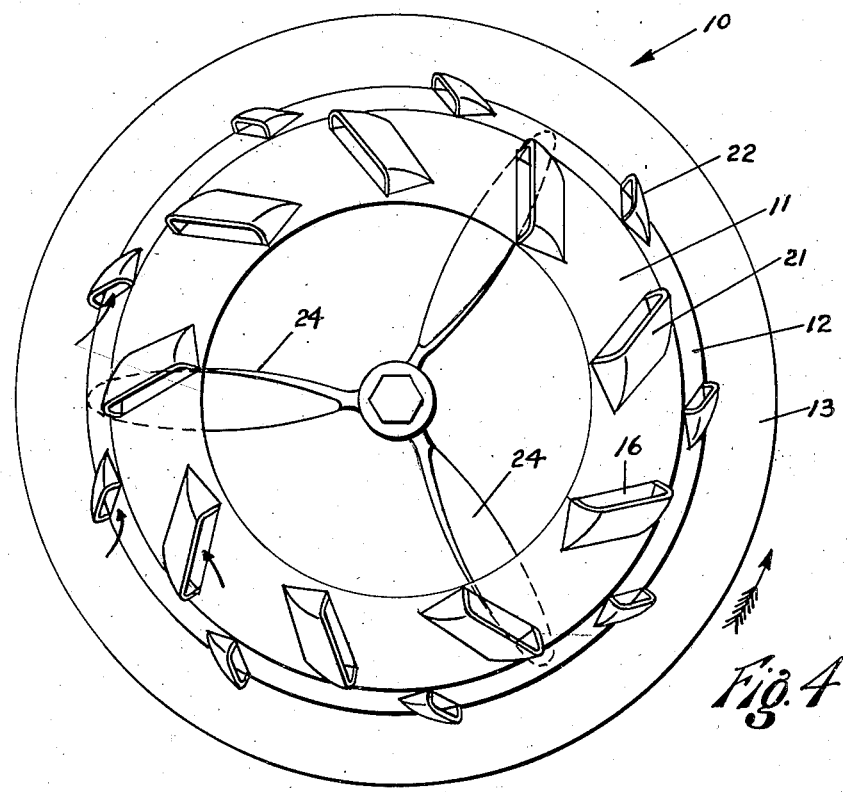
Figure 4 is a similar assembly of propeller and thrust ring showing elongated louvres on the face as well as on the flange face.
Figure 5:
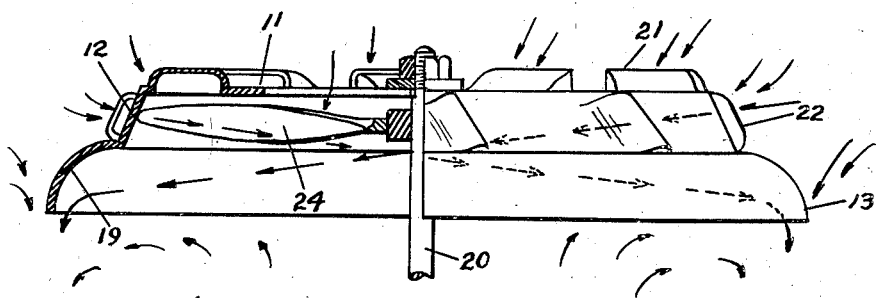
Figure 5 is a fragmentary cross sectional view of the device and assembly shown in Figure 4.

Similar characters of reference indicate corresponding parts throughout the several views, and referring now to the same, the character 10 shows an integrally constructed thrust ring, comprising a face 11, a flange 12 disposed on the outer periphery of the face 11, and an outer thrust ring 13 of a convex radial contour.

The face 11 and the flange 12 are provided with louvres or air scoops 14 and 15 respectively. These louvres 14 and 15 are punched and embossed out of the material constituting the device, and arranged to provide openings 16 facing the direction of revolution of the device. There is a canopy 17 forming the embossed portion of the louvre and is arranged to taper from the opening 16 to the face of the device.

The peripheral louvres 22 on the flange 12 and the louvres 21 on the radial face of the device shown in Figure 4, which is of a modified construction, are shown elongated and angularly disposed having their open end 16 in angular alignment.

The entire unit is shown attached to the tips of the propeller blades 24, which are shown mounted to a conventional propeller shaft 20. In Figure 2, I show a fragmentary cross section view of the thrust ring 10 applied to the blades 24 of a propeller, the shaft 20 supports a collar 25 to which are shown attached brace rods 26 leading to the brackets 27 attached to the inner face of the radial flange 12. These brackets 27 may be provided with a tapered roller bearing swivel socket for receiving and holding the tips of the propeller blades 24 in position.

In operation, the revolving of the propeller 24 and thrust ring unit 10 will cause a centripetally attracted flow of current through the peripheral louvres or scoops 15 or 22 at a maximum intake radius, thus representing the highest line or foot per second velocity, to travel across the space back of the propulsion unit 10 at a relatively sufficiently higher velocity than the horizontal currents induced by propulsion vanes 14 or 21, the propeller blades 24 thus merging the horizontal currents entering the opening of the ring 11 with the cross flow from the louvres 14 or 21, bending and directing the horizontal currents against the inner face 19 of the radial thrust ring 13, and causing a tangently or horizontally directed cone shaped or annular column flow to be diverted by the angle of the radial thrust ring 13 against the static bulk of the medium in which the unit is operating.

Another result obtained from the centripetal flow from the outer periphery of the device, which is converted into a centrifugal force on the inside face 19 of the thrust ring 13, is that a relatively low pressure area is created immediately in front of the radial thrust ring 13, thus inducing forward propulsion when mounted on a free moving device suspended or immersed in the operating medium. It is also apparent that a low pressure area is produced at a point immediately behind the revolving propeller blades 24 caused by the high velocity flow of the compacted medium, away from the radial thrust ring 13, thus establishing a pushing force, while at the same time, a pulling force is developed and maintained in the front of the unit by the suction created by the rapidly revolving force 11, having the louvres 14 and 21 and the propeller blades 24.

I submit, as a hypothetical illustration of the volumetric efficiency of the peripheral and front louvres or scoops, the following mathematical data:

Employing a peripheral ring of ten feet diameter, with the propeller turning at 1800 revolutions per minute, or 56,548.8 feet per minute, employing peripheral ports or scoops of two inch radius, with a total of twenty four scoops mounted on the peripheral area or flange, this portion of the propeller alone would displace 118,335.8 cubic feet of air per minute, flowing across the rear area (back of the propeller) against the radial thrust ring, and thence rearward against the static bulk of atmosphere at a speed of approximately ten miles per minute.

In addition, the frontal ports or scoops on the disc ring, with a hypothetical radius of three inches, figuring twelve scoops (total area in square feet: 2.3562), traveling in a diametric plane of 9' 6", at 1800 revolutions per minute (53,721.86 feet per minute), would displace 126,579,446 cubic feet of air per minute, or a grand total air displacement for the combined operation of the front ring and peripheral flange of 244,915.24 cubic feet per minute.

To determine the relative propulsion efficiency of the ring as against the maximum effectiveness of that portion of the propeller tips that are covered by the ring, it is only necessary to compare the cubic air displacement of this portion of the propeller tips, in customary or normal operation, with the total displacement of the ring.

It is obvious, of course, that the larger the air scoops or louvres, the greater the cubic displacement so that the mathematical ratio can be increased merely by increasing the size of the openings.

While I have described a broad form of construction of the device, I do not wish to limit my invention to the specific construction shown and described, for many changes may suggest themselves in the form and design of the invention, and I reserve the right to make such changes as conform with the spirit of the invention and the scope of the appended claims.

Having thus described my invention, what I claim and desire to secure by Letters Patent in the United States is:

1. A device of the character described, comprising in combination with a propeller, an annular flat ring open at the center, a rearwardly extending flange angularly disposed attached to or integral with the outer periphery of said ring, a radially disposed thrust ring attached to or integral with the rearward edge of said angularly disposed flange, louvres cut into and embossed outward from the face of said angularly disposed flange, all of said louvres having their open end facing the direction of revolution of said device, said propeller mounted on a shaft and said device mounted onto the extreme outer tips of said propeller blades.

2. A device of the character described, comprising in combination with a propeller, an annular flat faced ring open at the center, a rearwardly extending flange angularly disposed from the outer periphery of said ring, a thrust ring having a tangental contour attached to the rearward edge of said flange, a plurality of louvres cut into and embossing outward from the faces of said ring and flange, said louvres having their open end facing the direction of revolution of said device, a shaft, said propeller mounted on said shaft, a collar encircling said shaft at a point behind its point of attachment, brace rods corresponding with the number of propeller blades, said brace rods extending outward from said shaft collar, brackets attached to the inner face of said flange, said brace rods supported on their outwardly extending edge, by said brackets and the tip of said propeller blades attached to said brackets.

3. A device as described in claim 2, in which the louvres on the face of the ring and flange have their open ends angularly disposed.

4. A device of the character described, comprising in combination with a propeller, an integral assembly consisting of a flat ring open at the center, a rearwardly extending flange angularly disposed, projecting from the outer periphery of said ring, a radially disposed thrust ring of tangental contour extending outward from the rearward edge of said angularly disposed flange, said thrust ring provided with a tangental, rear surface, louvres cut into and embossed outward from the face of said flat ring and angularly disposed flange, said louvres having their open end facing the direction of revolution of the device, a shaft, said propeller mounted onto said shaft, means for attaching said thrust ring assembly to the outwardly extending tips of said propeller blades.

5. A device of the character described, comprising in combination with a propeller, an integral assembly consisting of a flat ring open at the center, a rearwardly extending flange angularly disposed projecting from the outer periphery of said ring, a radially disposed thrust ring of tangental contour extending outward from the rearward edge of said angularly disposed flange, said thrust ring provided with a tangental rear surface, louvres cut into and embossed outward from the face of said flat ring and angularly disposed flange, said louvres having their open end facing the direction of revolution of the device, a shaft, said propeller mounted onto said shaft, means for attaching said thrust ring assembly to the outwardly extending tips of said propeller blades, a collar encircling said shaft at a point behind the point of attachment of said propeller to said shaft, brace rods extending from said collar to the means provided for attaching said thrust ring assembly to said propeller blades.

6. A device as described in claim 5, in which the louvres have a radially disposed lip at their opening to force the air admitted into the louvres against the inner face of the canopy of said louvres.

BERNARD J. PAULSON.